(12) United States Patent
Lau et al.

(10) Patent No.: US 12,077,341 B2
(45) Date of Patent: Sep. 3, 2024

(54) PACKAGING STORAGE CONTAINER

(71) Applicant: FINEST PRODUCTS LIMITED., Hong Kong (CN)

(72) Inventors: Kwok Din Lau, Hong Kong (CN); Kwan Ming Jimmy Lau, Hong Kong (CN)

(73) Assignee: FINEST PRODUCTS LIMITED., Hong Kong (CN)

( * ) Notice: Subject to any disclaimer, the term of this patent is extended or adjusted under 35 U.S.C. 154(b) by 0 days.

(21) Appl. No.: 17/551,231

(22) Filed: Dec. 15, 2021

(65) Prior Publication Data

US 2023/0182960 A1 Jun. 15, 2023

(51) Int. Cl.
  *B65D 25/10* (2006.01)
  *A45C 11/14* (2006.01)
  (Continued)

(52) U.S. Cl.
  CPC ............ *B65D 25/108* (2013.01); *A45C 11/14* (2013.01); *A45C 11/182* (2013.01); *A45C 13/02* (2013.01); *B65D 43/162* (2013.01); *G11B 33/025* (2013.01)

(58) Field of Classification Search
  CPC ............ G11B 33/0494; G11B 33/0433; G11B 33/0461; G11B 33/045; G11B 33/06;
  (Continued)

(56) References Cited

U.S. PATENT DOCUMENTS 6,443,300 B1 9/2002 Gelardi
6,554,132 B2 * 4/2003 Lau .................... G11B 33/0427
                                              206/307

(Continued)

FOREIGN PATENT DOCUMENTS

CN    2552135 Y     5/2003
CN    101506889 A   8/2009
(Continued)

OTHER PUBLICATIONS

Amazon.com, Amazon Product Serial Identification No. B000LNKUEW, Johnson Hardware 1700363H Bifold 36" 1700 Closet Door Hardware, 36 inch (Year: 2015).*

(Continued)

*Primary Examiner* — Anthony D Stashick
*Assistant Examiner* — Marcos Javier Rodriguez Molina
(74) *Attorney, Agent, or Firm* — Yue (Robert) Xu; Apex Attorneys at Law, LLP

(57) ABSTRACT

The present application relates to a packaging storage container, including a container bottom portion, a container cover portion, a ridge member and a tray. The container bottom portion is provided with a pair of articulated shaft-receiving bases, the tray is connected to a pair of articulated shaft-receiving bases through an articulated shaft, an inner space for self-adaptive rotation and shock absorption of the articulated shaft is formed in the articulated shaft-receiving base. The articulated shaft-receiving bases comprises a connecting piece and a pair of limiting walls, and the connecting piece is provided between the pair of limiting walls and is an arc-shaped piece curved upwards, the articulated shaft is provided with a pair of protruding portions with column shape in axial direction thereof, a longitudinal length of the articulated shaft between the pair of protruding portions is configured to correspond to the articulated shaft-receiving base.

11 Claims, 16 Drawing Sheets

(51) Int. Cl.
  *A45C 11/18* (2006.01)
  *A45C 13/02* (2006.01)
  *B65D 43/16* (2006.01)
  *G11B 33/02* (2006.01)

(58) Field of Classification Search
  CPC ... G11B 33/0427; G11B 33/025; A45C 11/14; A45C 11/182; A45C 13/02; A45C 11/00; A45C 11/008; A45C 11/20; A45C 13/18; A63H 17/00; B65D 25/108; B65D 43/162; B65D 1/38; B65D 11/10; B65D 11/18; B65D 11/1893; B65D 11/20; B65D 11/22; B65D 21/0209; B65D 21/022; B65D 21/0235; B65D 21/045; B65D 21/08; B65D 21/086; B65D 2203/00; B65D 2205/00; B65D 23/12; B65D 25/02; B65D 25/10; B65D 25/20; B65D 2543/00194; B65D 2543/00296; B65D 2543/00351; B65D 27/34; B65D 31/04; B65D 31/16; B65D 33/00; B65D 33/004; B65D 33/01; B65D 33/06; B65D 33/16; B65D 35/10; B65D 43/163; B65D 43/165; B65D 43/22; B65D 47/36; B65D 5/0005; B65D 5/0236; B65D 5/0245; B65D 5/321; B65D 5/38; B65D 5/4279; B65D 5/4802; B65D 5/50; B65D 5/5002; B65D 5/5028; B65D 5/5035; B65D 5/504; B65D 5/56; B65D 5/566; B65D 5/60; B65D 5/603; B65D 51/245; B65D 61/00; B65D 65/40; B65D 65/42; B65D 75/008; B65D 75/14; B65D 75/20; B65D 75/22; B65D 75/24; B65D 75/26; B65D 75/30; B65D 75/32; B65D 75/322; B65D 75/38; B65D 75/52; B65D 75/58; B65D 75/5811; B65D 75/5866; B65D 77/02; B65D 77/062; B65D 81/025; B65D 81/389; B65D 83/0055; B65D 85/18; B65D 85/30; B65D 85/34; B65D 85/544; B65D 85/546; B65D 85/548; B65D 85/58; B65H 2220/01; B65H 2220/02; B65H 2220/03; B65H 2801/06; B65H 2801/27; B65H 43/00; B65H 5/062; B65H 7/02; B65H 7/20
  USPC ..... 206/15, 307, 307.1, 308.1, 310, 0.5, 0.6, 206/0.7, 0.8, 0.83, 1.5, 6, 6.1, 37, 38, 39, 206/39.6, 45.2, 45.22, 45.23, 45.24, 206/45.28, 45.29, 77.1, 121, 167, 168, 206/171, 178, 186, 187, 190, 191, 197, 206/205, 209, 210, 215, 216, 222, 223, 206/224, 225, 228, 229, 232, 233, 234, 206/256, 264, 266, 268, 273, 277, 301, 206/303, 306, 308.2, 308.3, 309, 311, 206/312, 313, 315.1, 315.11, 316.1, 206/316.2, 317, 320, 335, 340, 361, 363, 206/364, 370, 371, 373, 386, 387.1, 206/387.11, 387.13, 387.15, 389, 397, 206/408, 409, 410, 424, 425, 427, 429, 206/438, 440, 441, 442, 445, 446, 447, 206/448, 449, 451, 453, 454, 455, 457, 206/459.1, 459.5, 460, 461, 469, 470, 206/472, 473, 477, 478, 484, 484.1, 206/484.2, 485.1, 486, 493, 494, 495, 206/499, 503, 504, 505, 508, 509, 511, 206/517, 521, 522, 523, 524, 524.1, 206/524.2, 524.3, 524.4, 524.5, 524.6, 206/525, 526, 530, 534, 534.1, 538, 539, 206/540, 554, 555, 557, 559, 560, 561, 206/564, 566, 570, 575, 576, 577, 579, 206/581, 584, 586, 587, 588, 591, 592, 206/593, 594, 596, 597, 600, 705, 707, 206/736, 740, 742, 748, 749, 750, 751, 206/752, 756, 757, 759, 762, 764, 767, 206/768, 770, 776, 779, 782, 783, 784, 206/800, 804, 806, 807, 812, 813, 814, 206/815, 820, 821, 823, 828, 831; 16/221; 40/120, 124.01, 124.06, 124.09, 40/124.16, 312, 340, 495, 539, 638, 644, 40/700, 711, 718, 721, 722, 723, 746, 40/748, 750, 754, 757, 761, 763, 786, 40/790; 211/1.51, 1.57, 4, 13.1, 26.2, 40, 211/41.1, 41.12, 41.14, 41.15, 41.17, 211/41.8, 42, 43, 45, 46, 48, 49.1, 51, 55, 211/59.3, 87.01, 88.01, 89.01, 90.03, 211/94.01, 94.02, 113, 116, 118, 121, 211/124, 129.1, 130.1, 133.1, 149, 162, 211/163, 164, 168, 175, 181.1, 183, 184, 211/186, 187, 189, 191, 194, 196, 208; 220/1.5, 4.21, 4.22, 4.23, 4.24, 4.27, 4.29, 220/4.33, 6, 23.4, 23.6, 23.8, 23.86, 220/23.88, 62, 62.11, 86.2, 210, 252, 253, 220/259.5, 263, 264, 266, 315, 320, 324, 220/326, 345.2, 345.5, 377, 476, 481, 220/495.01, 507, 520, 558, 691, 694, 770, 220/810, 816, 818, 826, 827, 829, 831, 220/832, 833, 835, 836, 837, 838, 839, 220/840, 841, 842, 844, 845, 921, 220/DIG. 33; 221/34, 44, 45, 46, 47, 53, 221/60, 61, 62, 63, 65, 285, 306; 224/164, 220, 311, 547, 567, 604, 605, 224/674; D9/433, 756; 217/57, 60 B, 217/60 C
  See application file for complete search history.

(56) References Cited

U.S. PATENT DOCUMENTS

| | | | |
|---|---|---|---|
| 2002/0112974 A1 | 8/2002 | Lau | |
| 2003/0168361 A1* | 9/2003 | Lau | G11B 33/0427 |
| 2007/0012582 A1* | 1/2007 | Lau | G11B 33/045 |
| 2007/0114147 A1* | 5/2007 | Libohova | G11B 33/045 |
| 2007/0170078 A1* | 7/2007 | Choi | G11B 33/045 |
| 2008/0041742 A1* | 2/2008 | Lau | G11B 33/0427 |
| 2011/0031141 A1* | 2/2011 | Lau | G11B 33/045 |
| | | | 206/308.1 |

FOREIGN PATENT DOCUMENTS

| | | | |
|---|---|---|---|
| CN | 110562612 A | 12/2019 | |
| CN | 110562613 A | 12/2019 | |
| EP | 1260455 A1 | 11/2002 | |
| JP | 2001278373 A | 10/2001 | |
| JP | 3089666 U | 10/2002 | |
| WO | WO-2011055146 A1 * | 5/2011 | ......... G11B 33/0427 |

OTHER PUBLICATIONS

EBay.com item No. 325409019562, Vintage Ideal Futuristic Flatbed Truck Red Plastic 1-757 Rail Car—1960's (Year: 1960) ( Year: 1960).*
Amazon.com, Amazon Product Serial Identification No. B000LNKUEW, Johnson Hardware 1700363H Bifold 36" 1700 Closet Door Hardware, 36 inch (Year: 2015) (Year: 2015).*

(56) References Cited

OTHER PUBLICATIONS

L. E. Johnson Products, 17OOFD Series Folding Door Hardware (Year: 2021) (Year: 2021).*
EBay.com item No. 325409019562, Vintage Ideal Futuristic Flatbed Truck Red Plastic1-757 Rail Car—1960's (Year: 1960).*
Amazon.com, Amazon Product Serial Identification No. BOOOLNKUEW, Johnson Hardware 1700363 H Bifold36" 1700 Closet Door Hardware, 36inch (Year: 2015).*
L. E. Johnson Products, 1700FD Series Folding Door Hardware (Year: 2021).*
Vintage Ideal Futuristic Flatbed Truck Red Plastic 1-757 Rail Car—1960's (Year: 1960).*
Amazon.com, ASIN = B0000LNKUEW, Johnson Hardware 1700363H Bifold 36" 1700 Closet Door Hardware, 36 inch Visit the Johnson Hardware Store (Year: 2015).*
L. E. Johnson Products, 17OOFD Series Folding Door Hardware (Year: 2021).*
The Japanese 1st Office Action issued on Oct. 24, 2023 for JP2022-198280.

* cited by examiner

PACKAGING STORAGE CONTAINER

FIELD

The present application relates to the technical field of object storage, and in particular to a packaging storage container for storing sheet-like objects.

BACKGROUND

Generally, a packaging storage container is used by users to store sheet-like objects, such as a star card, a stamp, a multimedia storage disk, or a data storage card. Since the above objects are thin and easily damaged, the user has a higher requirement to the anti-fall performance of the packaging storage container and the protection performance of the contained objects.

In the conventional technology, one type of the packaging containers for accommodating the sheet-like object is provided with a tray hinged to a packaging container body. The tray may also be used to hold sheet-like objects. However, such type of container has the following problems in use: firstly, the tray is easily stuck when being turned over, which causes an articulated shaft of the tray hinged to the packaging container body to be broken; secondly, the tray may be moved back and forth with the overturning of a cover of the packaging container, and a moving trajectory is irregular, and thus the overturning of the cover is blocked when the tray is in an abnormal position, and the articulated shaft of the tray hinged to the packaging container may be broken if the cover continues to be turned over, and after the container is closed, the tray is unstable and may shake inside the packaging container, and when the container falls, the tray may fly out of the container.

SUMMARY

An object according to embodiments of the present application is to provide a packaging container, which solves the problem in the conventional technology that a shaft of a tray hinged to a container body is easy to be broken, and sheet-like objects are prone to fall off.

In view of this, a packaging storage container is provided according to embodiments of the present application, which includes a container bottom portion, a container cover portion, a ridge member and a tray;
 the container bottom portion and the container cover portion are hinged to the ridge member, the container bottom portion and the container cover portion form a sealed container body with the ridge member, and the tray is configured to hold the sheet-like object;
 the container bottom portion is provided with a pair of articulated shaft-receiving bases, the tray is connected to a pair of articulated shaft-receiving bases through an articulated shaft provided on the tray, so that the tray is turned over around the articulated shaft-receiving bases, an inner space for self-adaptive rotation and shock absorption of the articulated shaft is formed in the articulated shaft-receiving base,
 the articulated shaft-receiving bases comprises a connecting piece and a pair of limiting walls, a lower end of the limiting walls is connected to the container bottom portion, and an upper end of the limiting walls is provided with hook-shaped members which are opposite to each other, the connecting piece is provided between the pair of limiting walls and is an arc-shaped piece curved upwards, the articulated shaft is provided with a pair of protruding portions with column shape in axial direction thereof, a longitudinal length of the articulated shaft between the pair of protruding portions is configured to correspond to the articulated shaft-receiving base, and the connecting piece is respectively connected with each of the pair of the limiting walls to form an inner space for accommodating the longitudinal length of the articulated shaft with the limiting walls,
 the diameter of the pair of protruding portions is greater than the largest lateral width of the limiting walls.

Preferably, both the container bottom portion and the container cover portion have a container edge member, and the pair of the limiting walls are arranged with lateral distance, and when one end of the tray abuts against the container edge member, the longitudinal length of the articulated shaft between the pair of protruding portions at another end of the tray does not contact with the limiting walls.

Preferably, the packaging storage container further comprises a pair of articulated shaft-protection members at both longitudinal ends thereof, which are located longitudinal outside the articulated shaft-receiving base,
 the articulated shaft-protection members have a shape of box and are open to the axial ends of the articulated shaft,
 the articulated shaft-protection members are provided with an elastic sheet and a stopper, the elastic sheet faces the axial end of the articulated shaft and is elastic and the stopper is arranged opposite to the axial end of the articulated shaft and configured to support the elastic sheet from backside,
 when the axial end of the articulated shaft is moved toward and thus abutted against the elastic sheet, the elastic sheet moves together with the articulated shaft, which is stopped by the stopper from backside.

Preferably, a first protuberance member and a second protuberance member for holding the sheet-like objects are provided on the tray, and the first protuberance member and the second protuberance member are located on opposite surfaces of the tray and protruding outside.

Preferably, the packaging storage container is provided with a press-hold member, and a recess for the press-hold member to pass through is defined on the tray, the packaging storage container has an open state and a closed state, and when the packaging storage container is switched from the open state to the closed state, the press-hold member passes through the recess and abuts against the sheet-like object.

Preferably, the press-hold member comprises a first press-hold member and a second press-hold member, the first press-hold member is connected to the container edge member of the container cover portion in lateral direction, and the second press-hold member is connected to the ridge member.

Preferably, the recess comprises a first recess away from the ridge member, the first press-hold member has an L-shaped structure, a front end of the first press-hold member is connected to the container edge member of the container cover portion in laterally direction, and when the packaging storage container is in the open state, a tail end of the first press-hold member faces upward, wherein when the packaging storage container is in the closed state, the tail end of the first press-hold member passes through the first recess downwardly, and abuts against the sheet-like object.

Preferably, the recess comprises a second recess close to the ridge member, the second press-hold member has an L-shaped structure, a front end of the second recess is connected to the ridge member, and when the packaging storage container is in the open state, a tail end of the press-hold member faces horizontally toward the container bottom portion, and when the packaging storage container is in the closed state, the tail end of the second press-hold member passes through the second recess downwardly, and abuts against the sheet-like object.

Preferably, the tray is configured as one or more identical trays, and each of the trays is turned around the articulated shaft-receiving bases 7 independently.

Preferably, each of the trays comprises a first panel and a second panel which are identical with each other, the first panel and the second panel correspond to the first protuberance member and the second protuberance member, respectively and are positioned on the same surface, the projections of the first panel and the second panel on the container bottom portion 1 are partially overlap.

Preferably, the first panel and the second panel have a shape of circle, square, rectangular, oval and/or provided with grooves thereon so as to accommodate a star card, a stamp, a multimedia storage disk, or a data storage card.

Compared with the conventional technology, the advantages of the present application are as follows:

the inner chamber for self-adaptive rotation and shock absorption of the articulated shaft is defined in articulated shaft-receiving base, when the tray is turned over, the tray can adaptively move along an inner wall of the limiting piece and the connecting piece, which can prevent the articulated shaft from being broken due to being stuck in the articulated shaft-receiving base. The pair of the limiting walls are arranged separately with a lateral distance, so that, when one lateral end of the tray abuts against the container edge member, the articulated shaft at the other lateral end of the tray does not contact with the stops, which can prevent the articulated shaft from hitting the articulated shaft-receiving base and being broken when the packaging storage container falls. The pair of limiting walls are provided between the pair of the articulated shaft-receiving bases, which can prevent the tray from rushing out of the articulated shaft-receiving base when the packaging storage container falls. The front and back surfaces of the tray are provided with the protuberance members, which can hold the sheet-like objects on both sides, and the container bottom portion is further provided with an additional protuberance member, which can hold another sheet-like object. By providing the two recesses, the sheet-like objects are pressed against the container bottom portion when the container is closed, which can prevent the sheet-like objects from falling off.

BRIEF DESCRIPTION OF THE DRAWINGS

For more clearly illustrating embodiments of the present disclosure or the technical solutions in the conventional technology, drawings to be used in the description of the embodiments or the conventional technology will be briefly described hereinafter. Apparently, the drawings in the following description are only some embodiments of the present disclosure. For those skilled in the art, other drawings may be obtained based on the provided drawings without any creative work.

---

Figure 1:
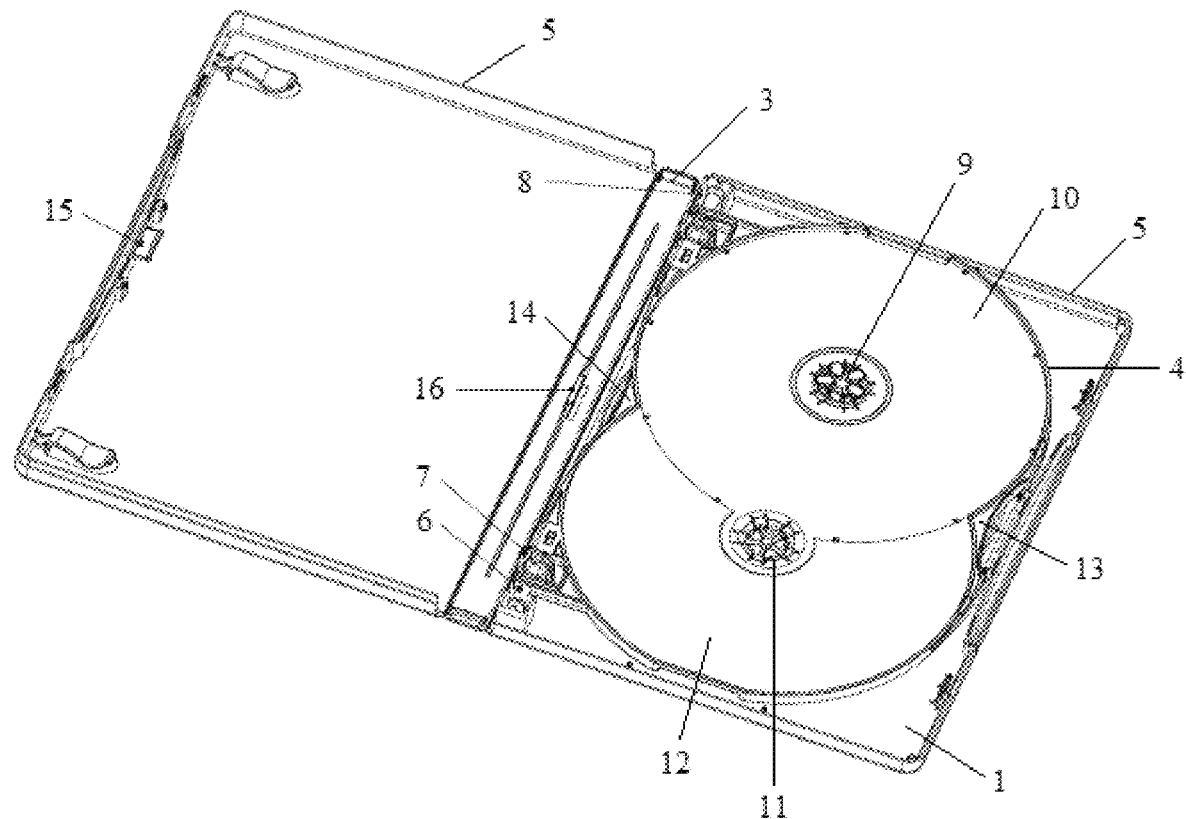
FIG. 1 is a schematic view of a packaging storage container in an open state according to embodiments of the present application.

Reference numerals in the drawings are as follows:

1 container bottom portion;
2 container cover portion;
3 ridge member;
4 tray;
5 container edge member;

Reference numerals in the drawings are as follows:

6 articulated shaft;
7 articulated shaft-receiving base;
8 articulated shaft-protection member
9 first protuberance member;
10 first panel;
11 second protuberance member;
12 second panel;
13 first recess;
14 second recess;
15 first press-hold member;
16 second press-hold member;
17 limiting wall;
18 connecting piece;
19 hook-shaped member;
21 sheet-like object;
61 protruding portion
81 elastic sheet
82 stopper.

DETAILED DESCRIPTION OF THE EMBODIMENTS

The technical solutions according to the present disclosure will be described clearly and completely as follows in conjunction with the drawings. It is apparent that the described embodiments are only a part of the embodiments according to the present disclosure, rather than all of the embodiments. Based on the embodiments of the present application, all other obtained without creative efforts by those of the ordinary skill in the art shall fall within the protection scope of the present application.

In the description of the present application, it should be noted that, the orientation or position relationship indicated by the terms "center", "upper", "lower", "left", "right", "vertical", "horizontal", "inner" and "outer" is based on the orientation or position relationship shown in the drawing, which is merely for the convenience of describing the present application and simplifying the description, rather than indicating or implying that the device or member must have a specific orientation, be constructed and operated in a specific orientation, and therefore cannot be understood as limiting the present application. In addition, the terms "first", "second" and "third" are merely used for descriptive objects, and cannot be understood as indicating or implying relative importance.

In the description of the present application, it should be noted that, unless otherwise clearly specified and limited, the terms "mounting", "connection" or "communication" should be understood in a broad sense. For example, it may be a fixed connection or a detachable connection; it may be a mechanical connection or an electrical connection; it may be a direct connection, or an indirect connection through an intermediate medium, or an internal communication between two components. For those skilled in the art, the specific meaning of the above terms in the present application can be understood under specific circumstances.

Herein, the term "longitudinal" or "longitudinal direction" refers to the direction of the largest length of the packaging storage container, which is in the same direction with the axial length of the articulated shaft, and the term "lateral" or "lateral direction" refers to the direction of the width of the packaging storage container, which is perpendicular to the "longitudinal direction".

Embodiment 1

Referring to FIG. 1, a packaging storage container is provided according to embodiments of the present application, which is configured to accommodate sheet-like objects, and includes a container bottom portion 1, a container cover portion 2, a ridge member 3 and a tray 4. The container bottom portion 1 and the container cover portion 2 are hinged to two opposite lateral edges of the ridge member 3, the container bottom portion 1 and the container cover portion 2 are both provided with container edge members 5, the container bottom portion 1 and the container cover portion 2 form a sealed container body with the ridge member 3, and the sheet-like objects are stored in the sealed container body. The container bottom portion 1 and the container cover portion 2 can turn over around the ridge member 3, so that the packaging storage container can be operated between an open state and a close state. The tray 4 is configured to hold and accommodate the sheet-like objects.

Referring to FIGS. 2A to 2E, the container bottom portion 1 is provided with a pair of separate articulated shaft-receiving bases 7 at the lateral inner edge, the tray 4 is connected to the articulated shaft-receiving base 7 through an articulated shaft 6 provided thereon, an inner space for self-adaptive rotation and shock absorption of the articulated shaft 6 is defined in the articulated shaft-receiving base 7, and the articulated shaft 6 is received in the inner space of the articulated shaft-receiving base 7, so that the tray 4 can turn over around the articulated shaft-receiving base 7.

Figure 2A:
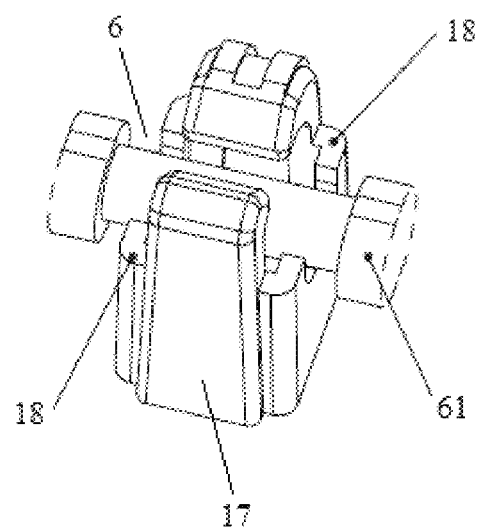
FIG. 2A is a schematic view of the fitting of an articulated shaft-receiving base with an articulated shaft of the packaging storage container according to embodiments of the present application.
Figure 2B:
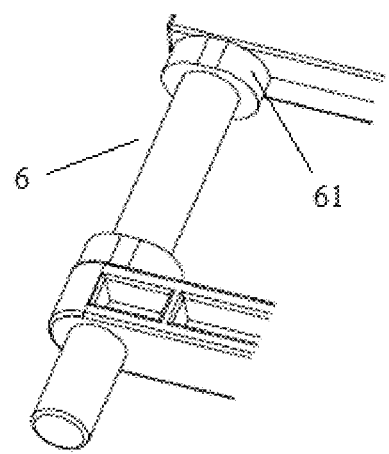
FIG. 2B is a schematic structural view of the articulated shaft of the packaging storage container according to embodiments of the present application.
Figure 2C:
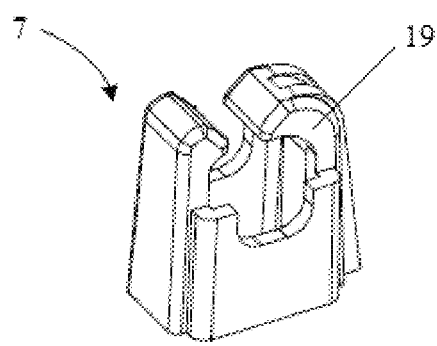
FIG. 2C is a schematic structural view of the articulated shaft-receiving base of the packaging storage container according to embodiments of the present application.

The articulated shaft-receiving bases 7 includes a connecting piece 18 and a pair of limiting walls 17, a lower end of the limiting walls 17 is connected to the container bottom portion 1, and an upper end of the limiting walls 17 is provided with a hook-shaped member 19, the pair of limiting walls 17 are provided to be spaced apart from each other, that is, the hook-shaped members 19 of the pair of limiting walls 17 are provided opposite to each other without contacting with each other. A gap is provided between the hook-shaped members 19 of the pair of limiting walls 17. In addition, as shown in FIGS. 2A and 2B, the articulated shaft 6 is provided with a pair of protruding portions 61 with column shape in axial direction thereof, the longitudinal length of the articulated shaft 6 between the pair of protruding portions 61 is configured to correspond to the articulated shaft-receiving base 7 and is able to be inserted between the pair of limiting walls 17 through the gap between the hook-shaped members 19 and is slightly longer than the longitudinal length of the limiting walls 17, so that the limiting walls 17 can realize the engagement with the articulated shaft 6 through said longitudinal length. The articulated shaft 6 enters between the pair of limiting walls 17 through the gap, so that the limiting walls 17 can realize the engagement with the articulated shaft 6. The connecting piece 18 is provided between the pair of the limiting walls 17, and the connecting piece 18 is respectively connected with each of the pair of the limiting walls 17 to form the inner space for accommodating said longitudinal length with the limiting walls 17, and the connecting piece 18 is an arc-shaped piece curved upwards. In the conventional technology, the articulated shaft is often stuck in the articulated shaft-receiving base, and the user may break the articulated shaft if the user continues to turn over the tray. Referring to FIGS. 4A to 4D, the articulated shaft-receiving base 7 according to the embodiments enables the longitudinal length of the articulated shaft 6 between the pair of protruding portions 61 to be adaptable with the arc-shaped structure of the connecting piece 18 so as to move along it when the tray 4 is turned over, and during said movement, said longitudinal length of the articulated shaft 6 keeps on contacting with the connecting piece 18 so as to be supported, and thus can adaptively be located at a position where the tray 4 can be turned smoothly, which prevents the articulated shaft 6 from being broken when the articulated shaft 6 is stuck and the user continues to turn over the tray 4.

In addition, the pair of protruding portions 61 may be integrated with the articulated shaft 6 or be separates parts and mounted to the articulated shaft 6.

Figure 6A:
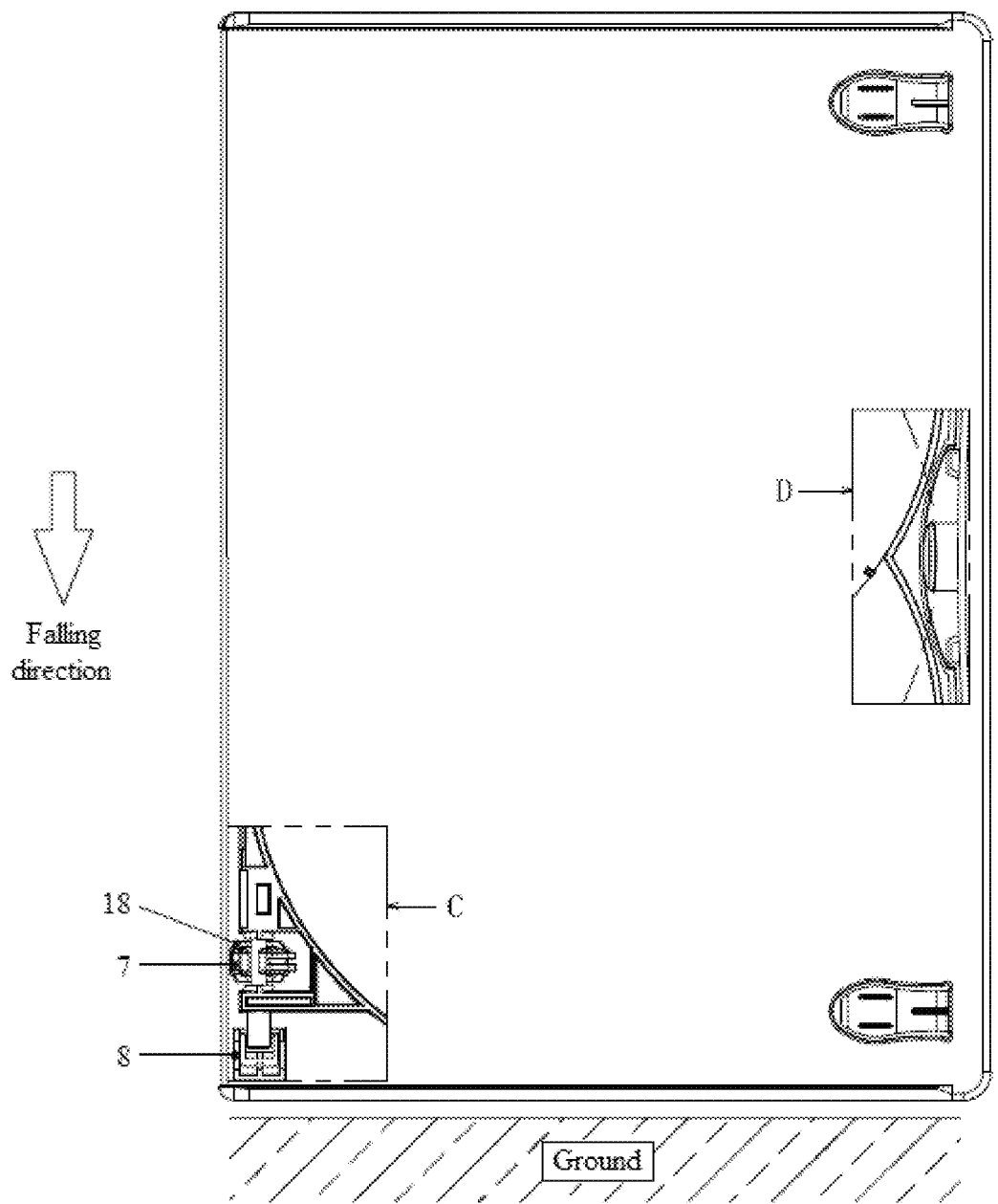
FIG. 6A is a schematic view of the packaging storage container in the second falling state according to embodiments of the present application.
Figure 6B:
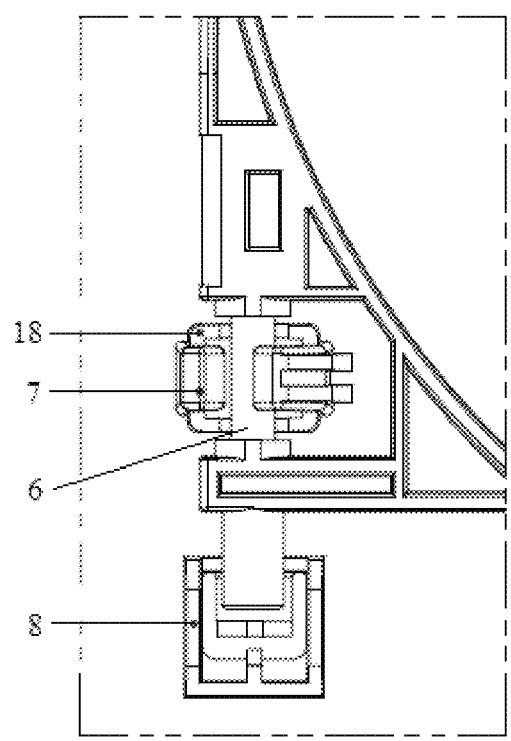
FIG. 6B is partial enlarged sectional view of area C in FIG. 6A.
Figure 6C:
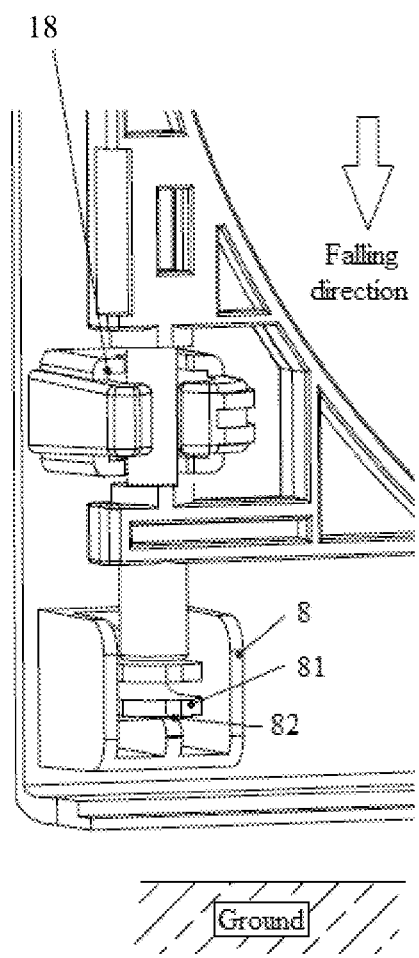
FIG. 6C is a partial enlarged sectional view of the packaging storage container in the second falling state according to embodiments of the present application.
Figure 6D:
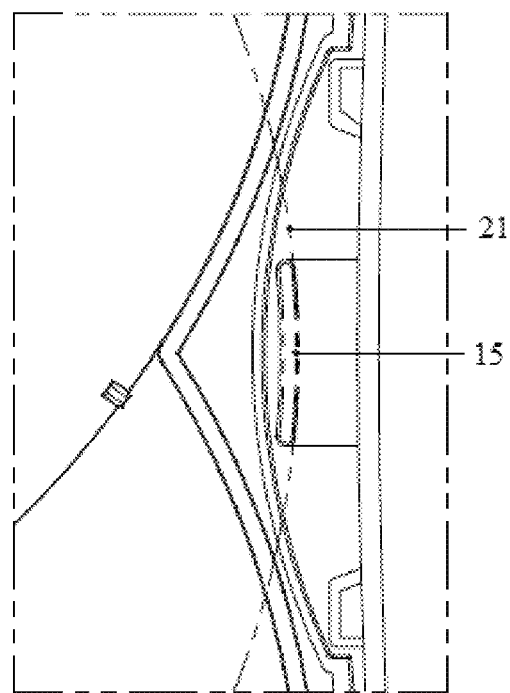
FIG. 6D is partial enlarged sectional view of area D in FIG. 6A.
Figure 7A:
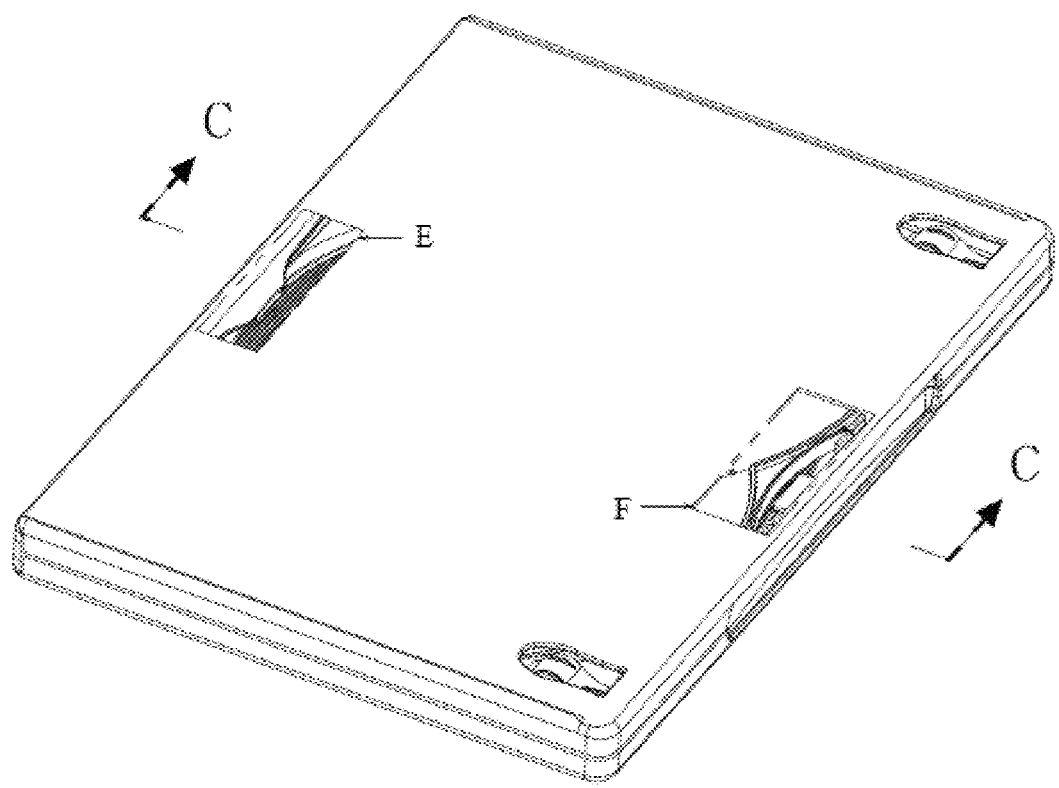
FIG. 7A is a schematic view of a packaging storage container in a close state according to embodiments of the present application.
Figures 7B, 7C:
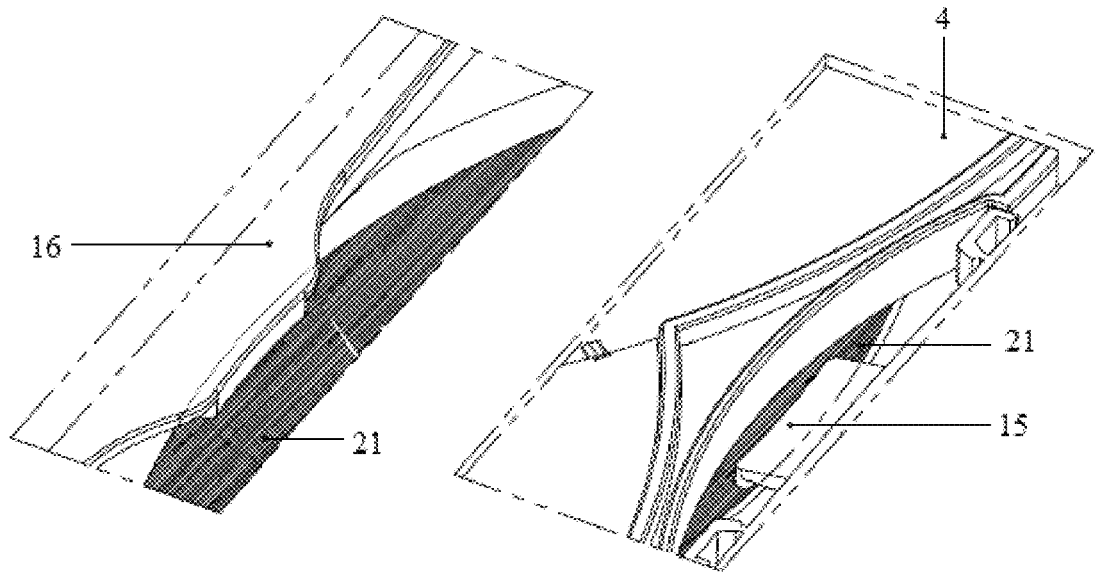
FIG. 7B is partial enlarged cross sectional view of area F in FIG. 7A.
FIG. 7C is partial enlarged cross sectional view of area E in FIG. 7A.
Figure 8A:
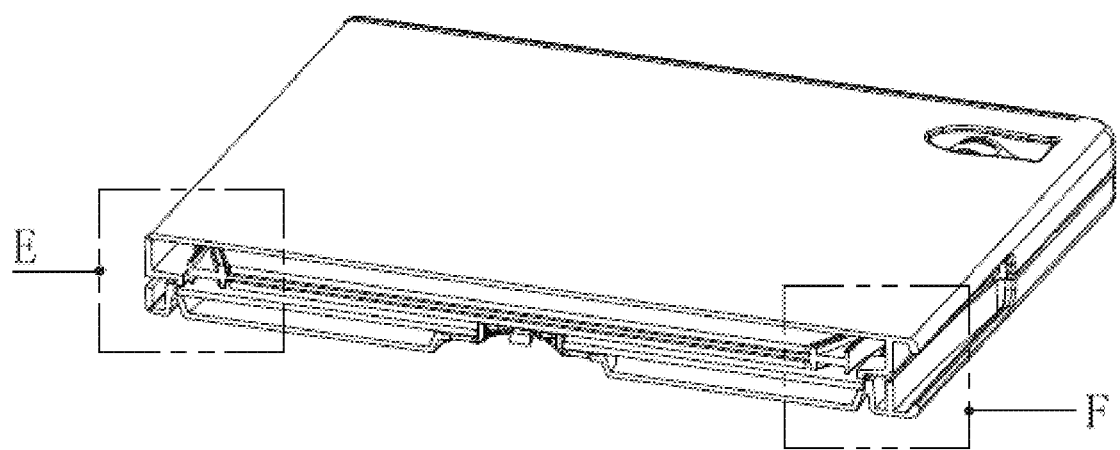
FIG. 8A is a cross sectional view of FIG. 7A along line C-C.
Figure 8B:
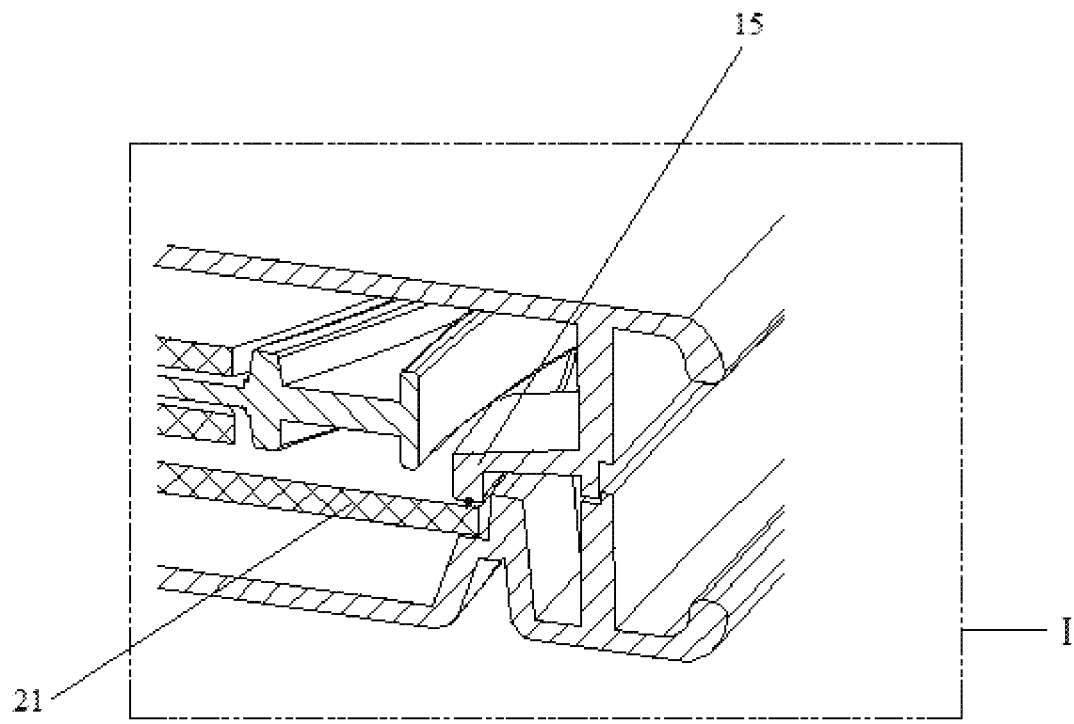
FIG. 8B is partial enlarged view of area E in FIG. 8A.
Figure 8C:
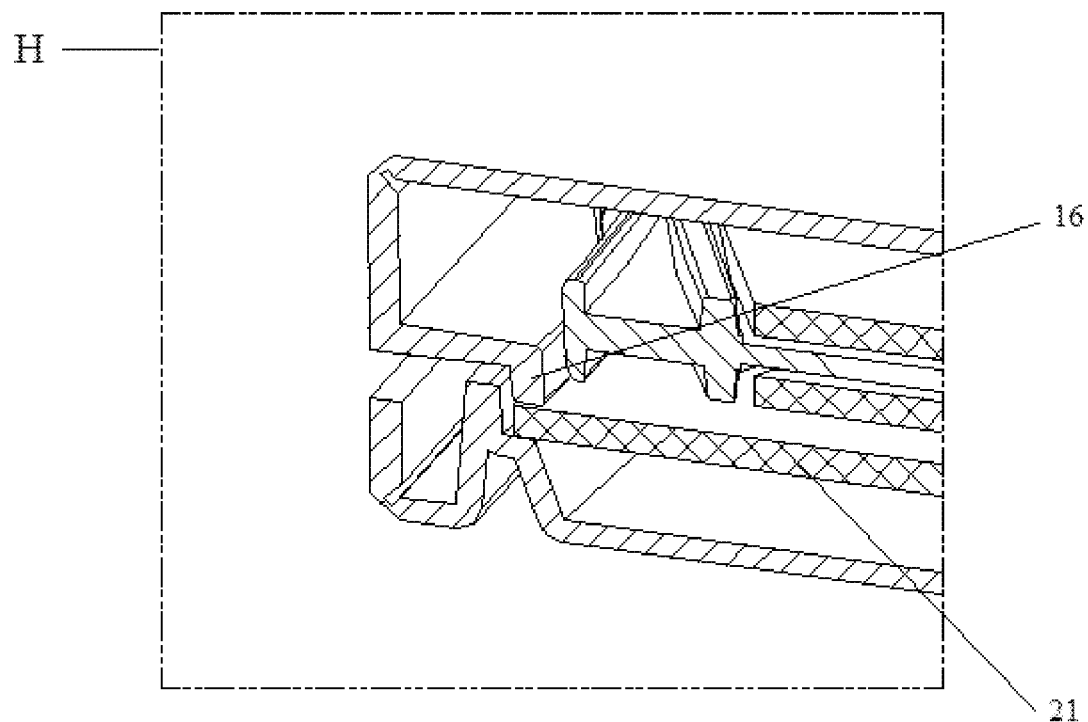
FIG. 8C is partial enlarged view of area F in FIG. 8A.

Specially, referring to FIGS. 2A and 2B, the diameter of the pair of protruding portions 61 is greater than the largest lateral width of the limiting walls 17, so that the protruding portions 61 can limit the axial movement of the articulated shaft 6 relative to the articulated shaft-receiving base 7 in the longitudinal direction by contacting and abutting against one end of the limiting walls 17. Therefore, when the packaging storage container falls in direction shown in FIG. 6A, the protruding portions 61 will abuts against the limiting walls 17 so as to stop the trays 4 moving downward, and thus the trays 4 cannot be disengaged from the articulated shaft-receiving base 7.

Figure 2D:
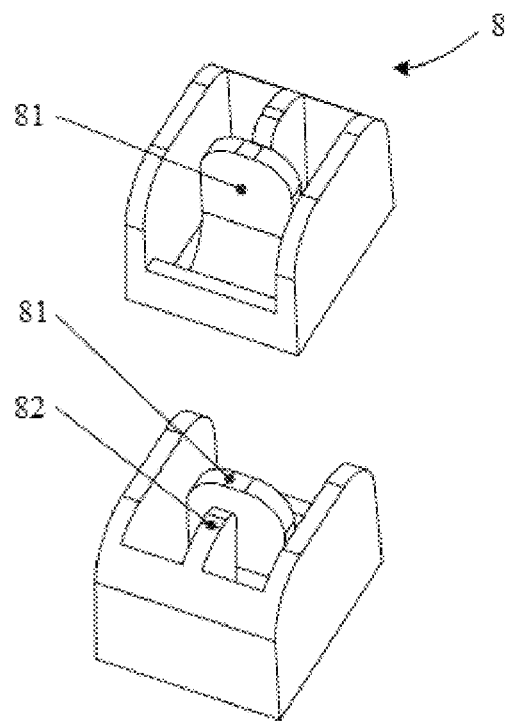
FIG. 2D is a schematic structural view of an articulated shaft-protection member of the packaging storage container according to embodiments of the present application.
Figure 2E:
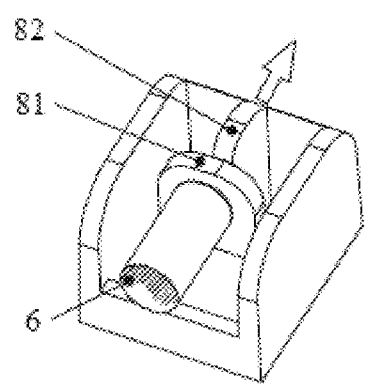
FIG. 2E is a schematic view of the cooperation of the articulated shaft-protection member with the articulated shaft according to embodiments of the present application.
Figure 3A:
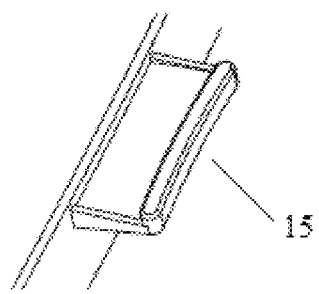
FIG. 3A is a schematic structural view of a first press-hold member of the packaging storage container according to embodiments of the present application.
Figure 3B:
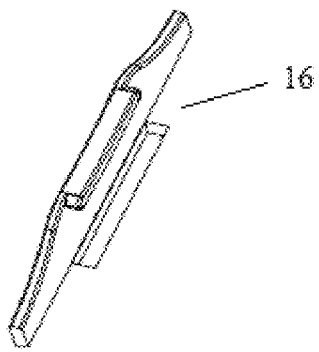
FIG. 3B is a schematic structural view of a second press-hold member of the packaging storage container according to embodiments of the present application.

Referring to FIGS. 2D and 2E, the packaging storage container is further provided with a pair of articulated shaft-protection members 8 at both longitudinal ends thereof, which are located longitudinal outside the articulated shaft-receiving base 7. The articulated shaft-protection members 8 have a shape of box and are open to the axial ends of the articulated shaft 6. The articulated shaft-protection members 8 are provided with an elastic sheet 81 and a stopper 82. The elastic sheet 81 faces the axial end of the articulated shaft 6 and is elastic. The stopper 82 is arranged opposite to the axial end of the articulated shaft 6 and configured to support the elastic sheet 81 from backside.

Referring to FIGS. 4B to 4D and 6A to 6C, the axial end of the articulated shaft 6 is moved toward and thus abutted against the elastic sheet 81 as the packaging storage container being falling down, the elastic sheet 81 will move together with the articulated shaft 6 due to its own elasticity until being stopped by the stopper 82 from back side. With such structure, the functions of damping and stopping to the articulated shaft 6 can be obtained, and articulated shaft 6 can be prevented from being damaged during falling down.

Figure 4A:
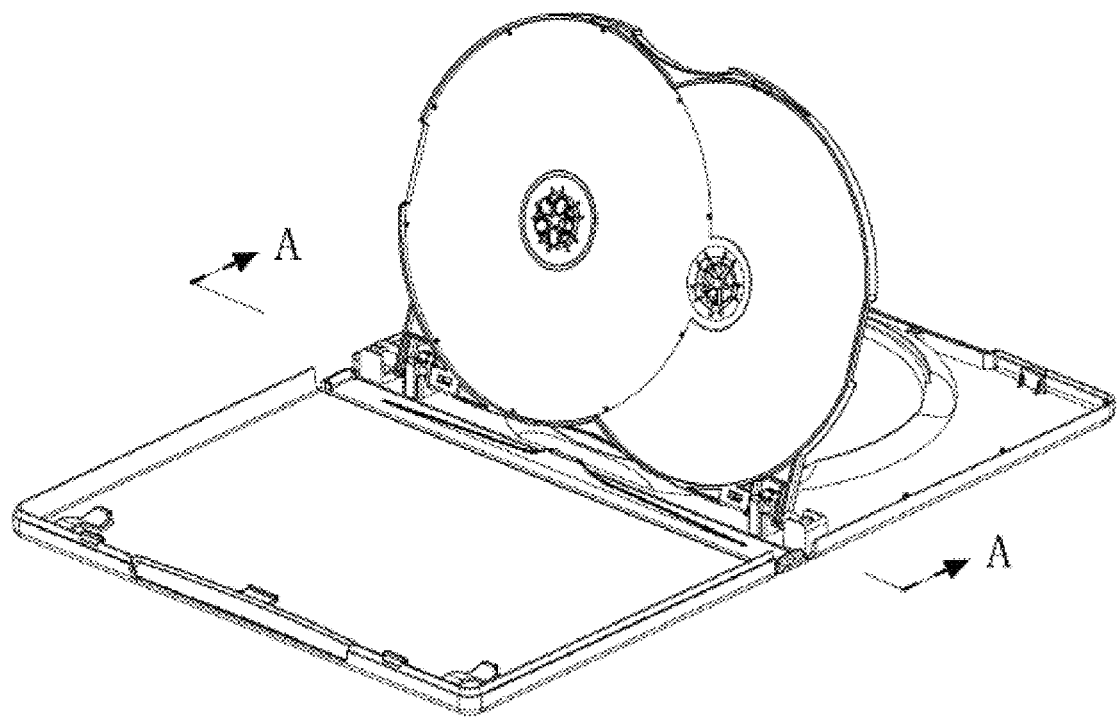
FIG. 4A is a schematic view of the packaging storage container in a turn-over state according to embodiments of the present application.
Figure 4B:
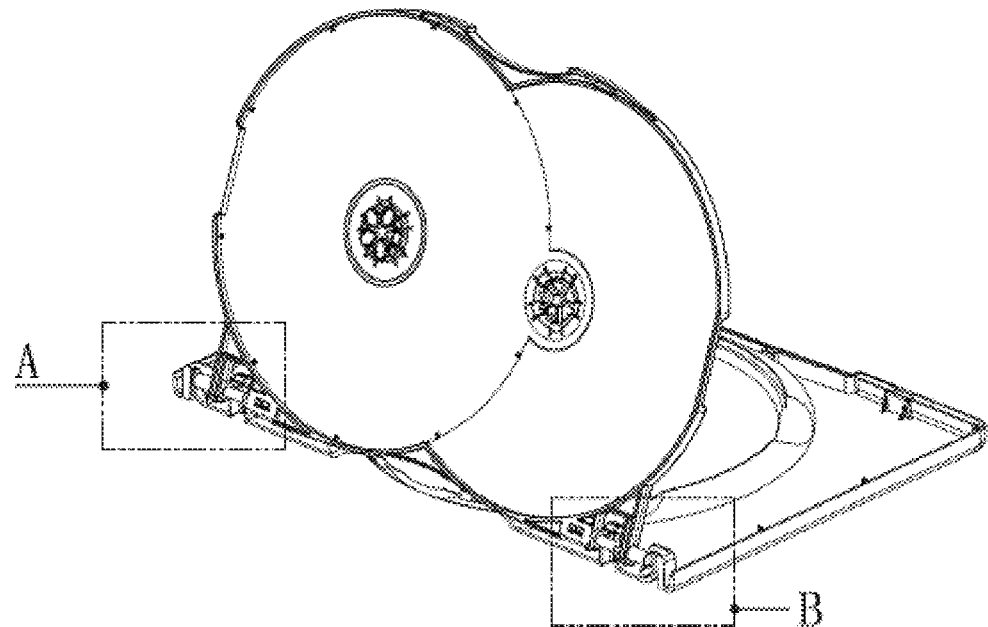
FIG. 4B is a schematic cross sectional view of the packaging storage container in the turn-over state according to embodiments of the present application.
Figure 4C:
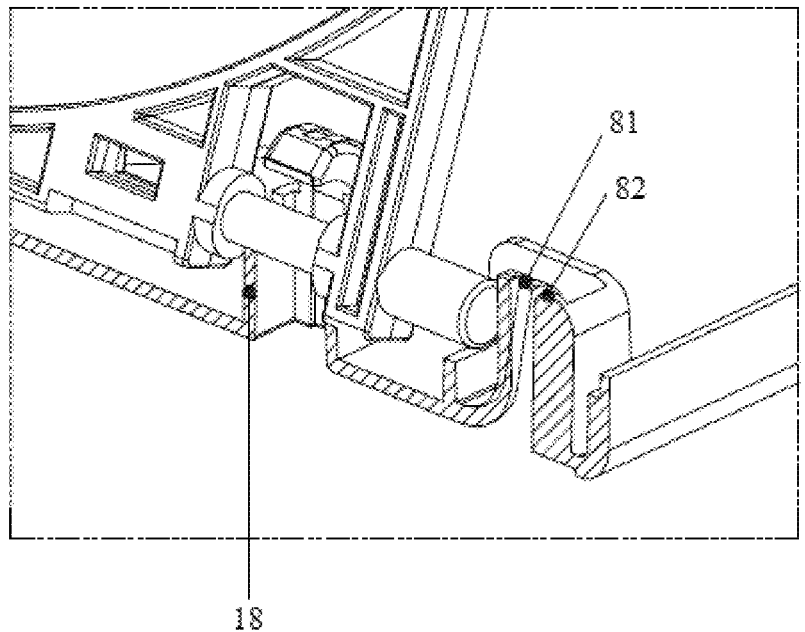
FIGS. 4C and 4D are partial enlarged sectional views of area B and area A in FIG. 4A, respectively.
Figure 4D:
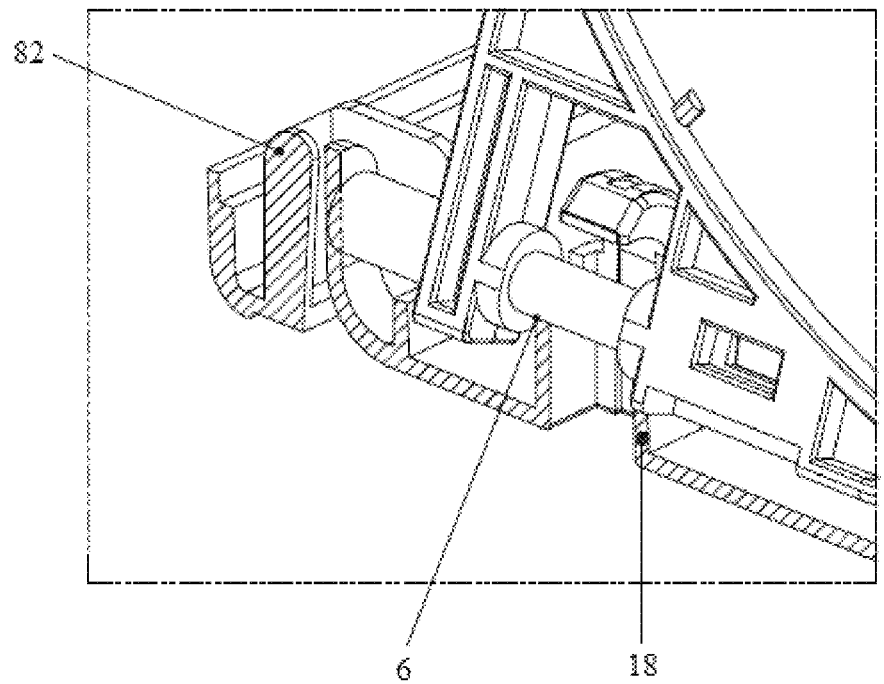
Figure 5A:
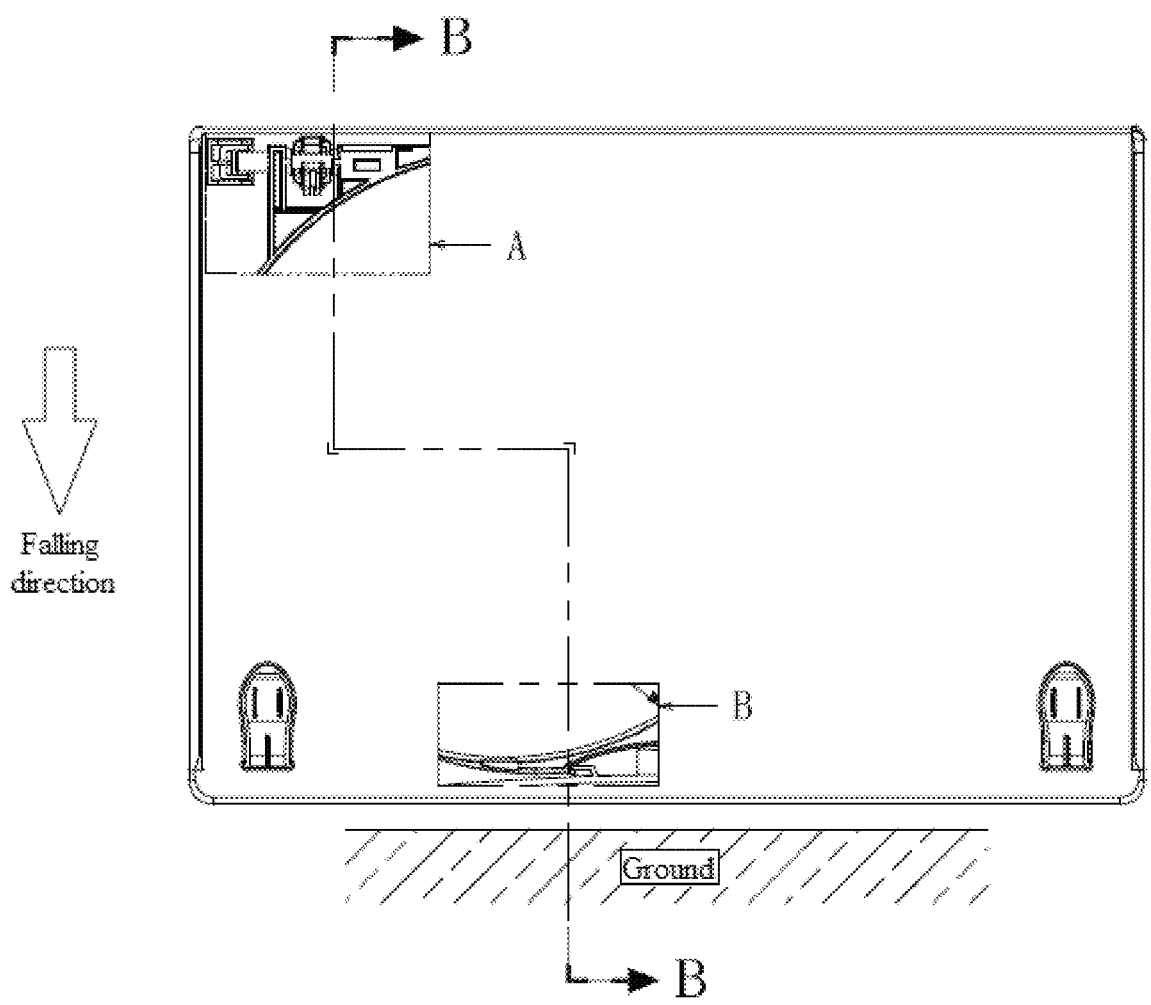
FIG. 5A is a schematic view of the packaging storage container in the first falling state according to embodiments of the present application.
Figure 5B:
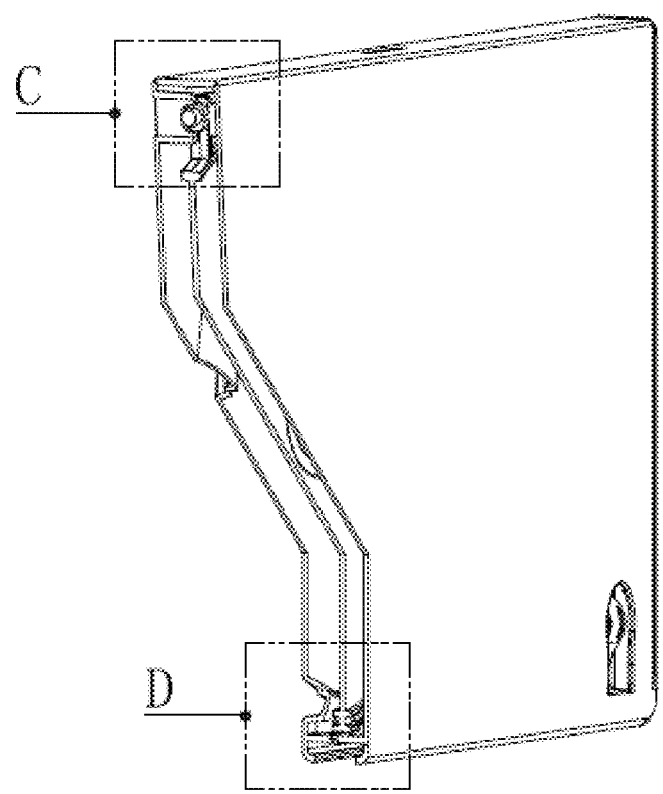
FIG. 5B is a cross sectional view of FIG. 5A along line B-B.
Figure 5C:
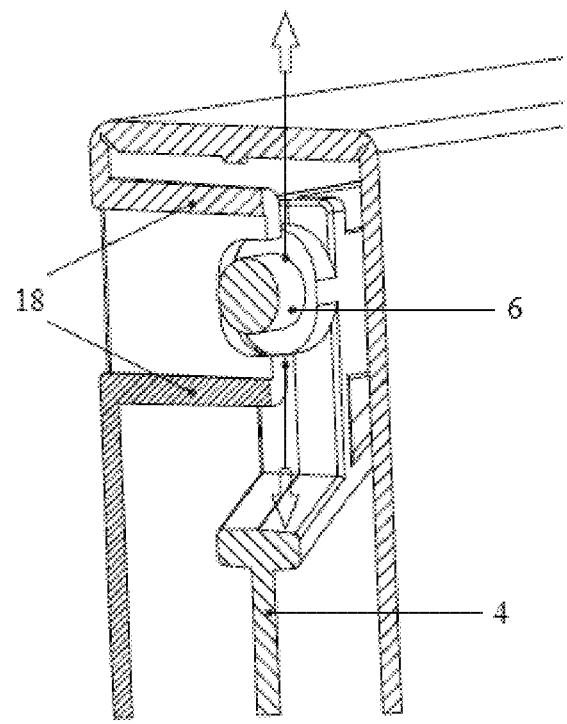
FIG. 5C is partial enlarged view of area C in FIG. 5B.
Figure 5D:
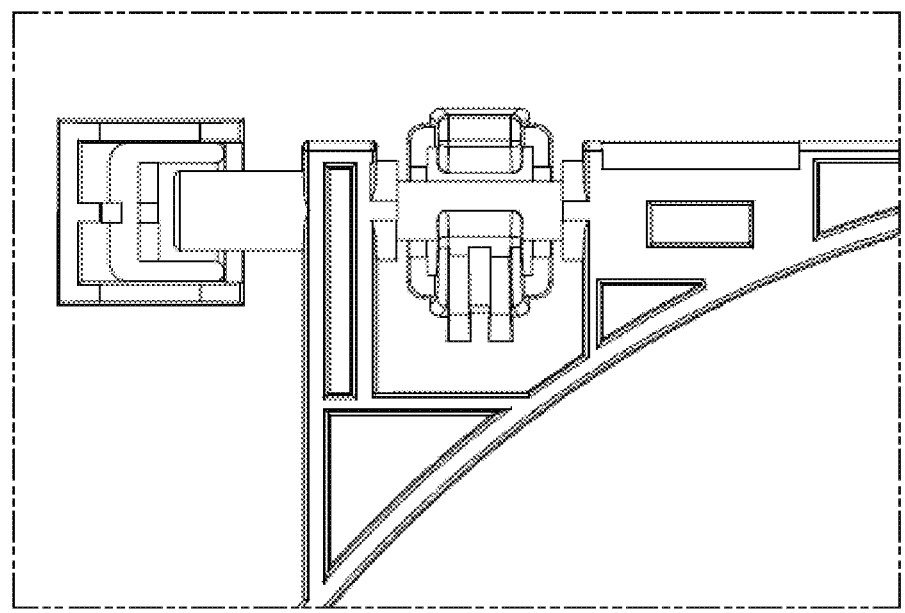
FIG. 5D is partial enlarged sectional view of area A in FIG. 5A.
Figure 5E:
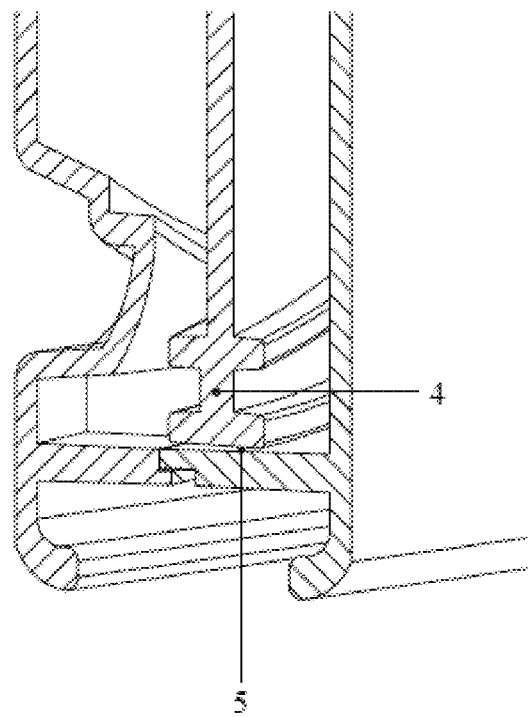
FIG. 5E is partial enlarged view of area D in FIG. 5B.
Figure 5F:
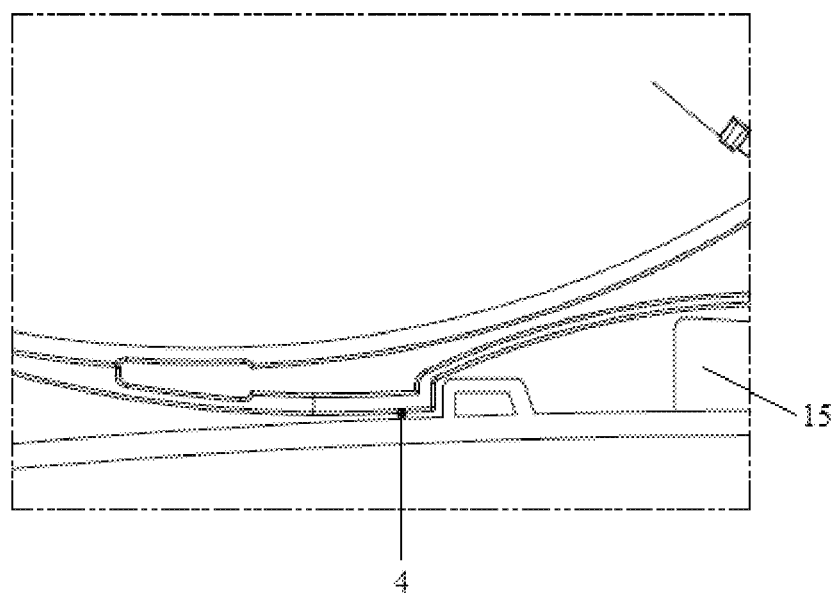
FIG. 5F is partial enlarged view of area B in FIG. 5A.

Referring to FIGS. 1 and 4A, both the container bottom portion 1 and the container cover portion 2 have a container edge member 5, and when the packaging storage container is closed, the container edge member 5 of the container bottom portion 1 abuts against the container edge member 5 of the container cover portion 2 to form the sealed container body with the ridge member 3. In the conventional technology, when the packaging storage container falls, the articulated shaft often strikes the articulated shaft-receiving base, which causes the breaking of the articulated shaft. Referring to FIGS. 5A to 5E, the pair of the limiting walls 17 of the articulated shaft-receiving base 7 according to this embodiment is arranged separately, and the distance between the pair of the limiting walls 17 is configured so that when one lateral end of the tray 4 abuts against the container edge member 5 (see FIGS. 5B, 5E and 5F), the longitudinal length of the articulated shaft 6 between the pair of protruding portions 61 at the other lateral end of the tray 4 does not contact with the limiting walls 17 (see FIGS. 5B, 5C and 5D). Therefore, when the packaging storage container in the closed state falls, one end of the tray 4 abuts against the container edge member 5 first, and the articulated shaft 6 does not contact with the limiting walls 17 of the articulated shaft-receiving base 7, which prevents the articulated shaft 6 from being broken due to accidental fall or impact.

Referring to FIGS. 1A and 4A, the tray 4 may be configured as one or more identical trays 4, and each of the trays 4 shares the same one articulated shaft, and can be turned around the articulated shaft-receiving bases 7 independently. A first protuberance member 9 and a second protuberance member 11 for holding the sheet-like object are provided on each of the trays 4, and the first protuberance member 9 and the second protuberance member 10 are respectively located on opposite surfaces of each of the trays 4 with being offset so as to be symmetrical with the center of each tray, that is, both the front and back surfaces of each tray 4 are provided with a protuberance member protruding outwardly so as to hold a sheet-like object two surface of each tray.

An area of the tray 4 for holding and accommodating the sheet-like objects includes two identical panels, that is, a first panel 10 and a second panel 12, which respectively correspond to the first protuberance member 9 and the second protuberance member 11. The first panel 10 is connected with the second panel 12, the projections of the first panel 10 and the second panel 12 on the container bottom portion 1 are partially overlap. Preferably, the first panel 10 and the second panel 12 have a shape of circle, so that the connection part between the first panel 10 and the second panel 12 form a first recess 13 away from the ridge member 3 and a second recess 14 close to the ridge member 3, respectively. It should be understood by those skilled in the art that the first panel 10 and the second panel 12 may have a shape of square, rectangular, oval and so on according to the shape of the sheet-like objects to be hold and accommodated. Moreover, grooves may be formed on the local area of the trays so as to accommodate the objects with special shape and thickness. All these variants will fall within the scope of the present application.

Referring to FIG. 1, FIGS. 3A to 3B, FIGS. 6A and 6D, FIGS. 7A to 7C, and FIGS. 8A to 8C, a first press-hold member 15 and a second press-hold member 16 are provided on the packaging storage container of this embodiment. Special referring to FIG. 3A, the first press-hold member 15 has an L-shaped structure, a front end of the first press-hold member 15 (one end of the L-shaped structure) is connected to the container edge member 5 of the container cover portion 2 in laterally direction, and when the packaging storage container is in the open state and the container cover portion 2 is laid down, a tail end of the first press-hold member 15 (the other end of the L-shaped structure) faces upward. When the packaging storage container is in the closed state, the tail end of the first press-hold member 15 passes through the first recess 13 downwardly as the container cover portion 2 is turned over, and abuts against the sheet-like object 21. Special referring to FIG. 3B, the second press-hold member 16 also has an L-shaped structure, a front end of the second press-hold member 16 (one end of the L-shaped structure) is connected to the ridge member 3, and when the packaging storage container is in the open state and the ridge member 3 is laid down, a tail end of the second press-hold member 16 (the other end of the L-shaped structure) is positioned horizontally and parallel with the container bottom portion 1, and when the packaging storage container is in the closed state, the tail end of the second press-hold member 16 turned around along with the ridge member 3 so as pass through the second recess 14 downwardly, and abuts against the sheet-like object, and thus when the packaging storage container is in the closed state, the first and second press-hold members 15 and 16 can press the sheet-like object 21 against the container bottom portion 1 to prevent the sheet-like object 21 from falling out of the packaging storage container.

Finally, it should be noted that, the above embodiments are merely used to illustrate the technical solutions of the present application, not to limit it. Although the present application has been described in detail with reference to the foregoing embodiments, those having ordinary skills in the art should understand that they can still modify the technical solutions described in the foregoing embodiments, or equivalently replace some of the technical features. And these modifications or replacements do not cause the essence of the corresponding technical solutions to depart from the spirit and scope of the technical solutions of the embodiments of the present disclosure.

The invention claimed is:

1. A packaging storage container, used for accommodating a sheet-like object, the packaging storage container comprises a container bottom portion, a container cover portion, a ridge member and a tray;
   wherein the container bottom portion and the container cover portion are hinged to the ridge member, the container bottom portion and the container cover portion form a sealed container body with the ridge member, and the tray is configured to hold the sheet-like object;
   wherein the container bottom portion is provided with a pair of articulated shaft-receiving bases, the tray is connected to the pair of articulated shaft-receiving bases through an articulated shaft provided on the tray, so that the tray is turned over around the articulated shaft-receiving bases, an inner space for self-adaptive rotation and shock absorption of the articulated shaft is formed in the articulated shaft-receiving base,
   wherein the articulated shaft-receiving bases comprises a connecting piece and a pair of limiting walls, a lower end of the limiting walls is connected to the container bottom portion, and an upper end of the limiting walls is provided with hook-shaped members which are opposite to each other, the connecting piece is provided between the pair of limiting walls and an upper end surface of the connecting piece is arc-shaped, which is curved upwardly, the articulated shaft is provided with a pair of protruding portions with column shape in axial direction thereof, a longitudinal length portion of the articulated shaft between the pair of protruding portions is configured to correspond to the articulated shaft-receiving base, and the connecting piece is respectively connected with each of the pair of the limiting walls and the inner space is enclosed by the upper end surface of the connecting piece, the pair of the limiting walls and the hook-shaped members for accommodating the longitudinal length portion of the articulated shaft between the pair of protruding portions with the limiting walls,
   wherein a gap is provided between the hook-shaped members of the pair of limiting walls, the longitudinal length portion of the articulated shaft between the pair of protruding portions is able to be inserted between the pair of limiting walls through the gap between the hook-shaped members;
   wherein, the longitudinal length portion of the articulated shaft between the pair of protruding portions is able to be adaptable with the upper end surface of the connecting piece so as to move along the upper end surface of the connecting piece when the tray is turned over, and the longitudinal length portion of the articulated shaft between the pair of protruding portions is kept contacting with the upper end surface of the connecting piece so as to be supported on the upper end surface of the connecting piece,
   wherein the diameter of the pair of protruding portions is greater than the largest lateral width of the limiting walls.

2. The packaging storage container according to claim 1, wherein both the container bottom portion and the container cover portion have a container edge member, and the pair of the limiting walls are arranged with lateral distance, and when one end of the tray abuts against the container edge member, the longitudinal length portion of the articulated shaft between the pair of protruding portions at another end of the tray does not contact with the limiting walls.

3. The packaging storage container according to claim 1, wherein the packaging storage container further comprises a pair of articulated shaft-protection members at both longitudinal ends thereof, which are located longitudinal outside the articulated shaft-receiving base,
   wherein the articulated shaft-protection members have a shape of box and are open to both axial ends of the articulated shaft, respectively,
   wherein the articulated shaft-protection members are provided with an elastic sheet and a stopper, the elastic sheet faces each of the axial ends of the articulated shaft and is elastic and the stopper is arranged opposite to each of the axial ends of the articulated shaft and configured to support the elastic sheet from backside,
   wherein, when each of the axial ends of the articulated shaft is moved toward and thus abutted against the elastic sheet, the elastic sheet moves together with the articulated shaft, which is stopped by the stopper from backside.

4. The packaging storage container according to claim 1, wherein a first protuberance member and a second protuberance member for holding the sheet-like object are provided on the tray, and the first protuberance member and the second protuberance member are located on opposite surfaces of the tray and protrude outwardly from each of the opposite surfaces of the tray, respectively.

5. The packaging storage container according to claim 4, wherein the packaging storage container is provided with a press-hold member, and a recess for the press-hold member to pass through is defined on the tray, the packaging storage container has an open state and a closed state, and when the packaging storage container is switched from the open state to the closed state, the press-hold member passes through the recess and abuts against the sheet-like object.

6. The packaging storage container according to claim 5, wherein the press-hold member comprises a first press-hold member and a second press-hold member, the first press-hold member is connected to the container edge member of the container cover portion in lateral direction, and the second press-hold member is connected to the ridge member.

7. The packaging storage container according to claim 6, wherein the recess comprises a first recess away from the ridge member, the first press-hold member has an L-shaped structure, a front end of the first press-hold member is connected to the container edge member of the container cover portion in laterally direction, and when the packaging storage container is in the open state, a tail end of the first press-hold member faces upward, wherein when the packaging storage container is in the closed state, the tail end of the first press-hold member passes through the first recess downwardly, and abuts against the sheet-like object.

8. The packaging storage container according to claim 6, wherein the recess comprises a second recess close to the ridge member, the second press-hold member has an L-shaped structure, a front end of the second recess is connected to the ridge member, and when the packaging storage container is in the open state, a tail end of the second press-hold member faces horizontally toward the container bottom portion, and when the packaging storage container is in the closed state, the tail end of the second press-hold member passes through the second recess downwardly, and abuts against the sheet-like object.

9. The packaging storage container according to claim 1, wherein the tray is configured as one or more identical trays, and each of the trays is turned around the articulated shaft-receiving bases independently.

10. The packaging storage container according to claim 4, wherein the trays comprises a first panel and a second panel which are identical with each other, the first panel and the second panel correspond to the first protuberance member and the second protuberance member, respectively and are positioned on the same surface, the projections of the first panel and the second panel on the container bottom portion are partially overlap.

11. The packaging storage container according to claim 10, wherein the first panel and the second panel have a shape of either of circle, square, rectangular, oval and/or are provided with grooves thereon so as to accommodate a star card, a stamp, a multimedia storage disk, or a data storage card.

\* \* \* \* \*